Dec. 22, 1936.  C. W. ERVIN  2,065,436
ROTARY DRILL BIT
Filed Feb. 4, 1936
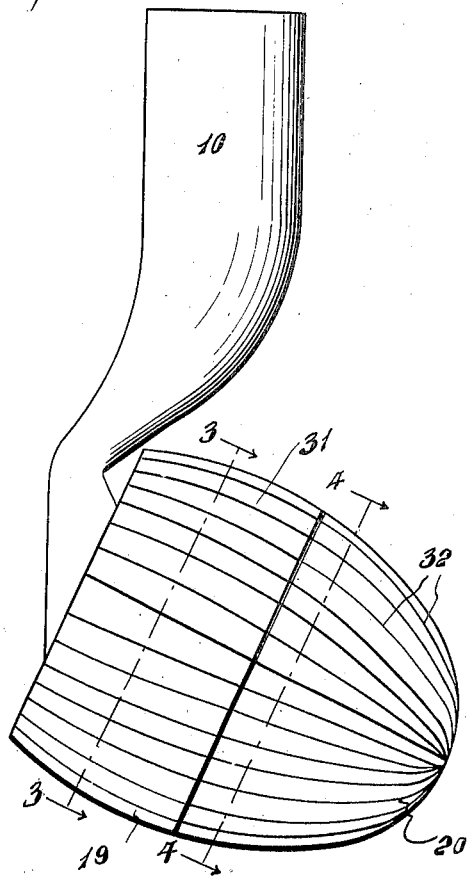
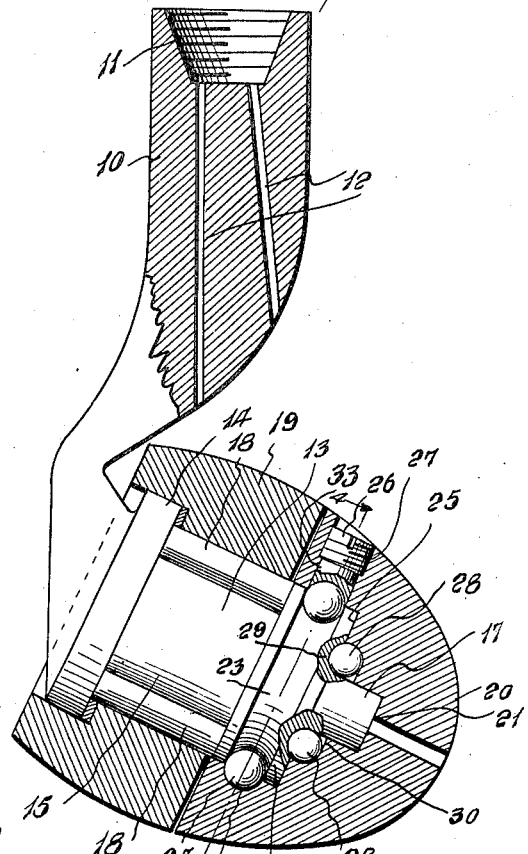
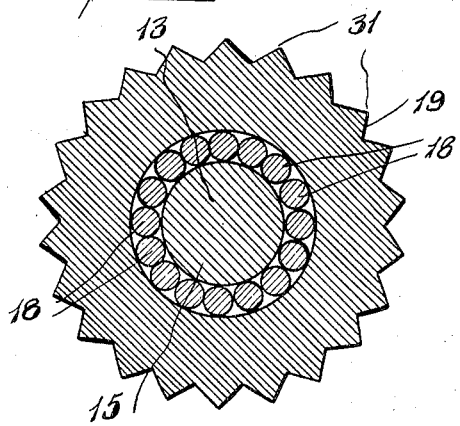
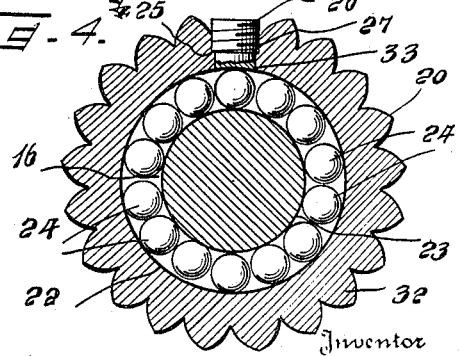
Inventor
Cecil W. Ervin
By L. F. Randolph Jr.
Attorney Patented Dec. 22, 1936

2,065,436

UNITED STATES PATENT OFFICE 2,065,436

ROTARY DRILL BIT

Cecil W. Ervin, Ada, Okla.

Application February 4, 1936, Serial No. 62,338

3 Claims. (Cl. 255—71)

This invention relates to a drilling bit of the type used in drilling oil wells and it aims to provide a novel construction which will combine conoid and cutter types in order to partake of the advantages of both and drill a reasonable amount in any formation under any condition.

It is particularly aimed to provide a construction which will drill a straight hole, wherein the axis is at such an angle as to allow the weight to rest on the center of the conoid and by rotating the drill stem give the conoid rotary motion on the axis allowing the cutters of the cutter and conoid to cut away formation at the bottom of the hole, a construction which will afford maximum service and minimum wear and a structure allowing slush to spray on cutter and conoid to keep the same clean.

The more specific objects and advantages will become apparent from a consideration of the description following taken in connection with accompanying drawing illustrating an operative embodiment.

In said drawing:—

Figure 1 is a side elevation of the improved drilling bit;

Figure 2 is a substantially central vertical sectional view taken through the drilling bit;

Figure 3 is a cross sectional view taken on the line 3—3 of Figure 1 and

Figure 4 is a cross sectional view taken on the line 4—4 of Figures 1 and 2.

Referring specifically to the drawing, wherein like reference characters designate like or similar parts, 10 designates a stock or shank which is adapted for vertical disposition in operation, as in Figure 1, and to be turned on a vertical axis. The shank has screw threads or the equivalent at 11 whereby it may be attached to a drilling equipment and from which connecting means 11, the water courses at 12 lead. The shank has a spindle 13 thereon preferably at the angle shown. Such shank has a shoulder portion 14 and a reduced cylindrical portion 15 extending therefrom and a race portion 16 extending from the cylindrical portion 15 and terminates in a cylindrical stud of reduced diameter as at 17. Roller bearings 18 in an angular row are disposed about the cylindrical portion 15 abutting at their opposite ends, the shoulder portion 14 and the race portion 16 and such bearings anti-frictionally mount an angular cutter 19 which removably telescopes over the bearings 18 and over and beyond the bearing portion or shoulder 14. The cutter 19 is generally of ring shape.

Another cutter is employed at 20 which is substantially of conoid shape and removably journaled on the race portion 16 and stud 17, having one or more openings 21 therethrough to allow slush to spray on the cutter and cone, to keep the same clean.

Said conoid cutter 20 and race portion 16 have registering grooves or races at 22 and 23 which are filled with ball bearings 24, and which bearings are supplied through an opening 25 in the cone and which opening is closed by a screw member 26, removably screw threaded at 37 in such opening. In addition, ball bearings are provided at 28 engaging the stud 17, and extending into races 29 cut in the outer end of the race member 16 and in the adjacent portion of the conoid cutter 20.

It will be noted that the ring cutter 19 and conoid cutter 20 have suitable cutting ribs on the exterior thereof as at 31 and 32. It will be noted that beneath the screw 26, a suitable plug or locking slug 33 is provided to directly engage the ball 24.

When the device is assembled, the roller bearings 18 are first positioned on the shank, being held in place by grease, following which a ring cutter is positioned on the spindle 13 as in Figure 2. Thereafter, bearings 28 are positioned in the conoid cutter 20, being held by grease following which the conoid cutter is applied over the race member 16. With the slugs 33 and 26 removed, the bearings 24 are inserted through the openings 25, following which slugs 33 and 26 are positioned.

Various changes may be resorted to provided they fall within the spirit and scope of the invention.

I claim as my invention:—

1. A tool of the class described, having a rotatable body, a shank extending inclinedly therefrom, said shank having a cylindrical portion and spaced shoulders, bearings about said portion and engaging said shoulders, a ring cutter disposed over said bearings, and a conoid cutter mounted on the shank independently of the ring cutter and located relatively close thereto, a race member providing one of said shoulders, said race member and conoid cutter having registering races, said conoid cutter having an opening leading to said races, bearings in said races insertable through said opening, and means to contact the bearings and close said opening.

2. A tool of the class described, having a rotatable body, a shank extending inclinedly therefrom, said shank having a cylindrical portion and spaced shoulders, bearings about said portion and engaging said shoulders, a ring cutter disposed over said bearings, and a conoid cutter mounted on the shank independently of the ring cutter and located relatively close thereto, a race member providing one of said shoulders, said race member and conoid cutter having registering races, said conoid cutter having an opening leading to said races, bearings in said races insertable through said opening, means to contact the bearings and close said opening, a lug on the shank extending from the race member, a raceway in one end of the race member adjacent said lug and a race-way in the conoid cutter, and bearings in the last mentioned race-ways.

3. A tool of the class described, having a rotatable body, a shank extending inclinedly therefrom, a ring cutter on said shank, said shank having a race-way, a conoid cutter disposed over said race-way preventing outward displacement of the ring cutter, said conoid cutter having a race-way registering with the first mentioned race-way and having an opening, bearings insertable through said opening into said raceways, and closure means for said opening engageable with said bearings.

CECIL W. ERVIN.